US006182097B1

(12) United States Patent
Hansen et al.

(10) Patent No.: US 6,182,097 B1
(45) Date of Patent: Jan. 30, 2001

(54) METHOD FOR CHARACTERIZING AND VISUALIZING PATTERNS OF USAGE OF A WEB SITE BY NETWORK USERS

(75) Inventors: Mark Henry Hansen, Hoboken; Wim Sweldens, New Providence, both of NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/082,792

(22) Filed: May 21, 1998

(51) Int. Cl.[7] .............................. G06F 15/00; G06F 17/00
(52) U.S. Cl. .................................. 707/526; 707/3; 707/5
(58) Field of Search ................................... 707/526, 1–4, 707/100–103, 500, 517, 530, 104, 6; 705/28; 709/100, 224; 345/326, 333, 146

(56) References Cited

U.S. PATENT DOCUMENTS

| | | | |
|---|---|---|---|
| 5,870,559 | * 2/1999 | Leshem et al. | 709/224 |
| 5,875,446 | * 2/1999 | Brown et al. | 707/3 |
| 5,935,207 | * 8/1999 | Logue et al. | 709/219 |
| 5,958,008 | * 9/1999 | Pogrebisky et al. | 709/223 |
| 5,974,572 | * 10/1999 | Weinberg et al. | 714/47 |

OTHER PUBLICATIONS

Web Pages for Accrue (www.accrue.com).
Web Pages for Andromedia (www.andromedia.com).
Web Pages for Microsoft Site Server (www.microsoft.com/siteserver/default.asp).
Web Pages for Webtrends (www.webtrends.com/wt_main.htm).
Web Pages for Net.Genesis (www.netgen.com/intro.html).
Web Pages for WebManage Technologies (www.webmanage.com/main.html).
Web Pages for Marketwave (www.marketwave.com/frames-default.htm).
Web Pages for WebSell (www.likeminds.com/solutions/websell/).

* cited by examiner

Primary Examiner—Joseph H. Feild
Assistant Examiner—Alford W. Kindred
(74) Attorney, Agent, or Firm—Martin I. Finston

(57) ABSTRACT

A system is disclosed for displaying information pertaining to the usage of Web pages. The system comprises first and second Web sites. The first Web site comprises plural Web-component files, each having a name in a Web-site directory. The second Web site comprises plural statistics files, each containing usage information about a corresponding Web-component file or sub-directory of Web-component files. The system further comprises a computing device that has a display screen, is operable by a user, and is in communication with the first and second Web sites. The computing device is operated under the control of Web-browser software effective for displaying, on the screen, Web components of the respective Web sites. Significantly, the computing device is effective for requesting and retrieving, from either of the Web sites, data that correspond to user-designated Web components, and it is effective for directing a data request to either of the Web sites in response to user-designation of a Web component from the other Web site.

1 Claim, 6 Drawing Sheets

FIG. 1B

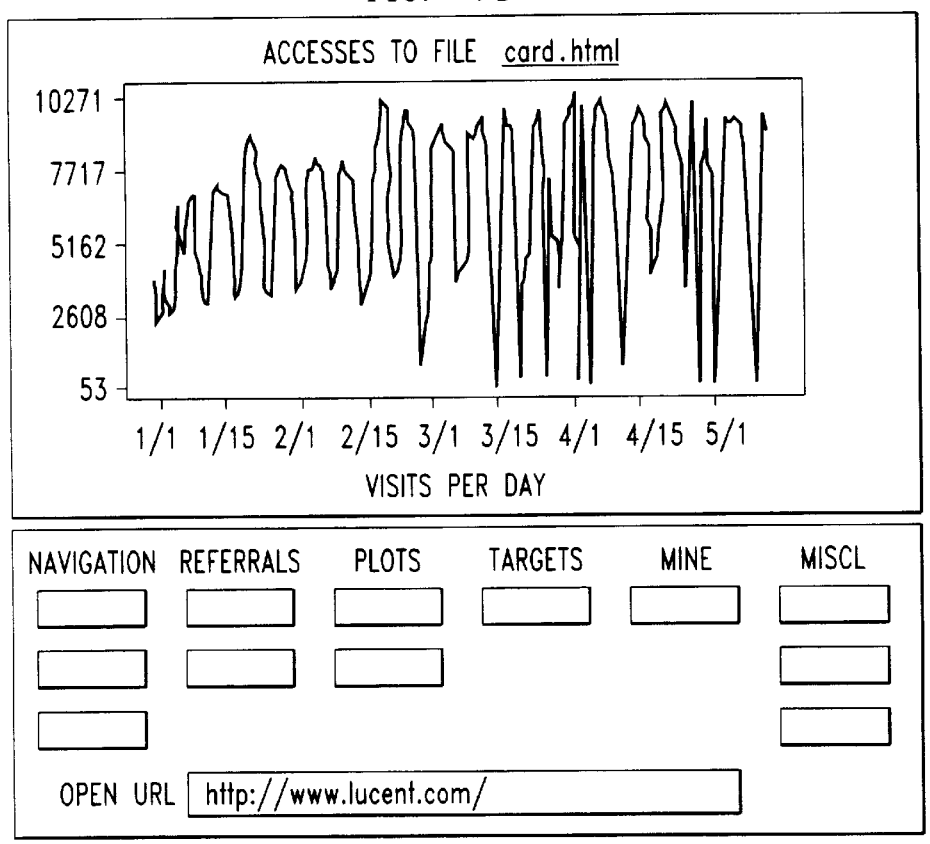

FIG. 1C

VISITS TO card.html

| HOST | REFERRAL |
|---|---|
| ismgate.ism.ca | • unavailable |
| izb.izb.de | • unavailable |
| rtd81-isdn.worldaccess.nl | • unavailable |
| 133.217.107.231 | www.news.com/news/item/0.4.192... |
| 160.124.16.86 | • unavailable |
| gulipin.miee.ru | • unavailable |
| ultra.netlab.sk | • unavailable |
| master.proxy.unisource.nl | • unavailable |
| macpbking.llnl.gov | • unavailable |
| 193.171.54.8 | • unavailable |
| lp17-14.desupernet.net | www.pcworld.com/news/daily/dat... |
| m6-106.pcnet.otol.fi | www.yahoo.com/business and eco... |
| westquad-190-212.reshall.umich.edu | • unavailable |
| user.uniworld.nl | • unavailable |
| louis.esisar.inpg.fr | • unavailable |
| tyo3.gate.nec.co.jp | • unavailable |
| 195.103.245.66 | • unavailable |

METHOD FOR CHARACTERIZING AND VISUALIZING PATTERNS OF USAGE OF A WEB SITE BY NETWORK USERS

FIELD OF THE INVENTION

The invention relates to tools, for use, e.g., by a content provider for a Web site, for summarizing and displaying information descriptive of usage patterns exhibited by visitors to the Web site.

ART BACKGROUND

The World Wide Web is currently a subject of intense and rapidly growing interest.

The World Wide Web is composed of interconnected data sources that are accessible to computer users through data-communication networks such as the Internet. The data available on the World Wide Web have been assembled by private individuals, commercial companies, government agencies, and special interest organizations. Much of this assembled information is organized into Web pages. A Web site is a collection of Web pages (and possibly other data which, together with Web pages, are generically referred to as Web components) offered by a sponsoring entity, herein referred to as the site owner.

Large Web sites are typically organized hierarchically. For example, corporate Web sites often consist of smaller Web sites, each providing information about a business unit of the parent company.

The Web site itself resides on one or more server hosts. Web components stored on the server host are offered to users of the World Wide Web through a software program known as a Web server. A network user downloads data from a Web site through a browser, a software program running on the client host. The browser establishes contact with the Web server and issues a request for data stored on the server host. This results in data from the server host being downloaded into the browser. This data is typically a HyperText document specifying information required by the browser to display the Web page (i.e., formatting information specifying the structure of the page, or URLs of images that are to be placed on the page), embedded client software programs which run inside the browser (e.g., Java bytecode), and other content to be downloaded to the client computer or displayable through client software programs that add to the browser's functionality (sometimes referred to as "browser plug-ins").

A visit to a Web site is defined as a series of downloads, from a specified Web server by a fixed client browser, that are contiguous in time. Each request for a Web component made by a client browser during the course of a visit is referrred to as a hit. (In at least some cases, it may be useful for distinguishing separate visits to consider the dormancy period between successive hits by a given client browser. A dormancy period exceeding a threshold of, e.g., fifteen minutes, may be taken to indicate the end of a visit.)

Commercial Web servers have the option of recording client requests in a logfile, generating a separate entry for each hit. In many cases, the logfile resides (at least temporarily) on the server host. The information collected in this file can include the hostname or host address of the visiting client, the time of the hit, and the name of the requested data file. An illustrative record of a client request is given below:

| | |
|---|---|
| 147.atlanta-02.ga.dial-access.att.net | hostname |
| -- | userid and authentication (not shown here) |
| [30/Nov/1997:00:03:09-0500] | date and time |
| GET | request method |
| /work/work.html | name of page requested |
| HTTP/1.0 | protocol used |
| 200 | return code |
| 9391 | number of bytes transferred |
| http://biz.yahoo.com/lucent.html | referral page |
| Mozilla/2.02E (Macintosh; U; 68K) | agent used (browser) |

From a visitor's point of view, it is clear that a visit to a given Web site begins with an initial request to the Web server (the entry point), consists of a number of consecutive downloads, and ends when the visitor either: (i) begins to request pages from a different Web site, or (ii) stops browsing altogether. The visitor's final request is referred to as the exit point.

The server host, on the other hand, experiences hits from many users simultaneously, and it records all requests chronologically. Consequently, the server host mixes visit information from different clients in the logfile. Because of this, it is not immediately evident, from an examination of the raw logfile, which hits correspond to which visit. Even the length of a given visit is not immediately evident. The lack of this information prevents the compilation of higher-level summaries of usage patterns.

Some software tools are commercially available for summarizing and displaying data describing Web-site usage. Often, these packages require the running of a special client software program in order to view the usage data.

One drawback of such a tool is that only those users who have installed the client software will have access to the Web site's usage information, even though many geographically separated people may have a legitimate interest in this information. This group may include, e.g., content providers, Web designers, and even visitors.

A second drawback is that such a specialized client approach can become impractical because of the cost to install and maintain the client program for each interested party.

A third drawback is that the presentation of the reported information is divorced from the immediate context of the Web site itself. Thus, although it may be convenient for the user to move quickly from a statistic about some Web page to the page itself, it is much less convenient for the user to move from any desired page or a feature of such a page to a corresponding statistic.

Other software tools provide reports, in the form of HyperText documents, on the usage of selected (such as the most popular) pages. Information from these reports can be displayed via the user-side browser, and links are provided for viewing the selected Web pages. However, these software tools also fail to provide convenient access from a Web page to the statistics that pertain to it.

SUMMARY OF THE INVENTION

We have provided a mechanism for rapid and convenient access from any selected Web page to the usage information that pertains to it, and from any selected display of usage information to the Web page or pages to which it pertains. Respective displays of Web-site content and of usage information can coexist on the screen of, e.g., the user's personal computer. Designation of an item of interest (by, e.g., clicking a mouse) in one of the respective displays results in the updating of information in the other display to correspond to the designated item. Moreover, our mechanism makes it readily achievable to synchronize one of the respective displays with the other. That is, as the user browses through one of the displays, the information in the other is automatically updated to correspond to that in the first display.

Thus, in a broad aspect, our invention involves a system for displaying information pertaining to the usage of Web pages. The system comprises first and second Web sites. The first Web site comprises plural Web-component files, each having a name in a Web-site directory. The second Web site comprises plural statistics files, each containing usage information about a corresponding Web-component file or sub-directory of Web-component files. The system further comprises a computing device that has a display screen, is operable by a user, and is in communication with the first and second Web sites. The computing device is operated under the control of Web-browser software effective for displaying, on the screen, Web components of the respective Web sites. Significantly, the computing device is effective for requesting and retrieving, from either of the Web sites, data that correspond to user-designated Web components, and it is effective for directing a data request to either of the Web sites in response to user-designation of a Web component from the other Web site.

Our preferred access mechanism involves a relationship between the Web site and the database in which the usage information is stored. As is well known, each Web component (i.e., Web page or one of its basic data building blocks) resides in a file, accessible through its URL. According to our access mechanism, the database that contains the usage information is organized such that each record is indexed by, and thus is retrievable under, the name of the corresponding file in the Web site directory.

Thus, in specific embodiments of the invention, each statistics file is indexed by the name of the corresponding Web file or sub-directory of Web files, and the computing device uses a common name of a file or file directory when it directs a data request to one Web site in response to user-designation of a Web component from the other Web site.

In further embodiments of the invention, we additionally provide a mechanism for distinguishing, by respective visit, visit information from a Web-server logfile, and for extracting informative usage statistics from such information.

GLOSSARY OF TERMS

Browser: a software program that runs on a client host and is used to request Web pages and other data from server hosts. These data can be downloaded to the client's disk or displayed on the screen by the browser.

Client host: a computer that requests Web pages from server hosts, and generally communicates through a browser program.

Content provider: a person responsible for providing the information that makes up a collection of Web pages.

Embedded client software programs: software programs that comprise part of a Web site and that get downloaded into, and executed by, the browser.

Hit: the event of a browser requesting a single Web component.

Host: a computer that is connected to a network such as the Internet. Every host has a hostname (e.g., mypc.mycompany.com) and a numeric IP address (e.g., 123.104.35.12).

HTML (HyperText Markup Language): the language used to author Web Pages. In its raw form, HTML looks like normal text, interspersed with formatting commands. A browser's primary function is to read and render HTML.

HTTP (HyperText Transfer Protocol): protocol used between a browser and a Web server to exchange Web pages and other data over the Internet.

HyperText: text annotated with links to other Web pages (e.g., HTML).

IP (Internet Protocol): the communication protocol governing the Internet.

Logfile: a file residing on the Web site in which the Web server logs information about browsers requesting Web components. The logfile typically contains one line per hit.

Pageview: the event of a browser downloading some or all of the Web components that make up a Web page and displaying the Web page. A pageview often consists of several hits.

Referral page: the URL of the Web page containing the HyperText link that led a visitor to the data currently being viewed. In most commercial browsers, the BACK button returns the visitor to this referral page.

Server host: a computer on the Internet that hands out Web pages through a Web server program.

URL (Uniform Resource Locator): the address of a Web component or other data. The URL identifies the protocol used to communicate with the server host, the IP address of the server host, and the location of the requested data on the server host. For example, "http://www.lucent.com/work.html" specifies an HTTP connection with the server host www.lucent.com, from which is requested the Web page (HTML file) work.html.

UWU server: in connection with the present invention, a special Web server in charge of distributing statistics describing Web traffic.

Visit: a series of requests to a fixed Web server by a single person (through a browser), occurring contiguously in time.

Visitor: a person operating a browser and through it, visiting a Web site.

Web component: a basic data building block that makes up a Web page. A Web component may contain text, HyperText, images, embedded client software programs, or other data displayable by a browser (such as, for example, QuickTime videos).

Web designer: a person, typically one skilled in graphical design, who has charge of designing Web pages.

Web master: the (typically, technically trained) person in charge of keeping a host server and Web server program running.

Web page: a canonical piece of multimedia information on a Web site. A Web page is typically an HTML document comprising other Web components, such as images.

Web server: a software program running on a server host, for handing out Web pages.

Web site: a collection of Web pages residing on one or multiple server hosts and accessible through the same hostname (such as, for example, www.lucent.com).

BRIEF DESCRIPTION OF THE DRAWING

FIG. 1B is a detail of an exemplary display for window 35 of FIG. 1.

FIG. 1C is a detail of an exemplary display for window 40 of FIG. 1.

DETAILED DESCRIPTION

1. Viewing Web Usage Information

Figure 1:
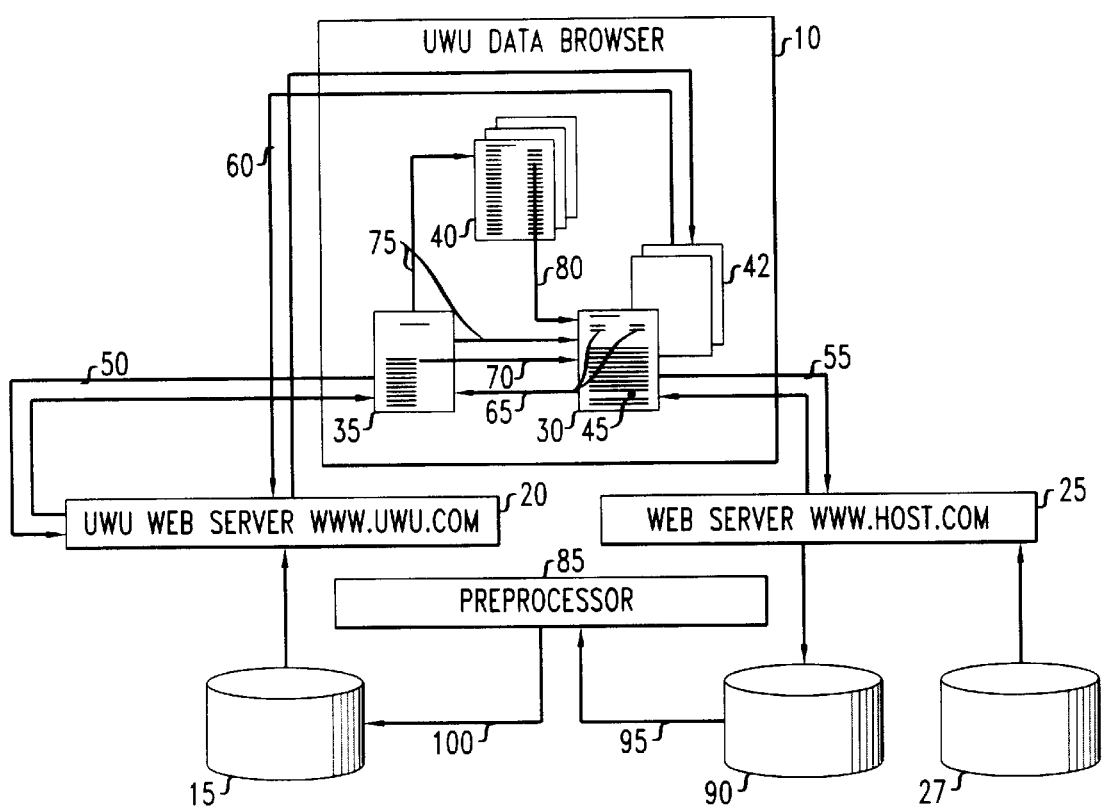
FIG. 1 is a schematic diagram of a system for retrieving and displaying Web-site usage information, in accordance with the invention in an exemplary embodiment.
Figure 1A:
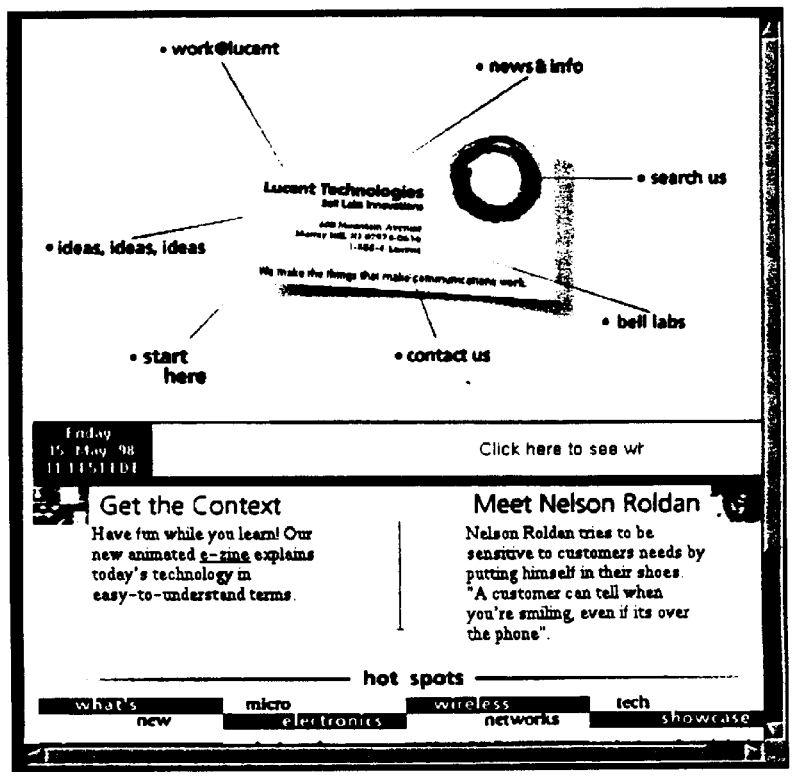
FIG. 1A is a detail of an exemplary display for window 30 of FIG. 1.

With reference to FIG. 1 (and with further reference to FIGS. 1A–1C), client 10 is a Web browser, such as Netscape Navigator®, Microsoft Internet Explorer®, or another such readily available standard browser. Client 10 must be specially configured to function as a data browser for accessing the usage statistics that are stored in storage device 15 of UWU server 20. This configuration is carried out by requesting an initializing page from UWU server 20. This page includes embedded client programs that coordinate the ordinary browsing of Web pages from Web site 25 (for simplicity of presentation, reference numeral 25 also denotes the server corresponding to this Web site) with the retrieval and display of usage statistics stored on UWU server 20. In our current implementation, JavaScript 1.2 is used to manage this interaction.

In use, web pages (stored in storage device 27) that belong to Web site 25 are displayed in browser window 30 on the screen of, e.g. the user's personal computer pc). Usage data collected from visits to site 25 are requested from server 20 and displayed in browser windows 35 and 40. In addition, statistical information from the UWU server 20 is superimposed directly onto window 30 through a sequence of layers 42.

To achieve a complete correspondence between the components of a Web site and usage information, the displays in data browser 10 must be synchronized. For example, when a link on page 45 (shown as being displayed in the browser window 30) is selected, the requested URL is downloaded into the browser window 30, while at the same time the corresponding usage information for the requested URL is displayed in windows 35 and 40, and layers 42. In our current implementation, JavaScript 1.2 is used to intercept "click" events occurring in the browser window 30 and then dispatch requests to both servers 20 and 25. These requests are indicated by the directed communication links 50, 55 and 60. The action of updating windows 35 and 40 and layers 42 in response to a event "click" in window 30 is indicated by the arrows 65 in the figure.

Within the client 10, we enable two other types of synchronized interaction. In the first (indicated by arrow 70 in the figure), the user "clicks" on HyperText links displayed in browser window 35, triggering the loading of the associated URL into window 30. For example, window 35 might contain a list of the most frequent referral pages followed by those visitors requesting the page displayed in browser window 30. This type of usage information is presented as a list of HyperText links that, when "clicked," directs the browser window 30 to the selected referring page (whether or not it resides on the Web site 25).

In the second coordinated interaction, designated by communication branches 75 and 80, statistical displays (such as scatter plots, simple tables and tree- or graph-based representations) are used to direct the browser window 42 and window 30. For example, our current implementation can display a summary of all the visits that access the page displayed in window 30. This summary is viewed in the auxiliary browser window 40.

By way of illustration, window 35 might show a graph of usage versus time (measured in days), in which the quantity plotted is the total number of visits (each day) in the course of which a particular page is requested. By clicking on a particular portion of the graph, the user could make a selection of a particular day. In response, auxiliary window (or windows) 40 might display a summary list of all visits that took place on the selected day. By using an auxiliary window in this manner, the information is displayed without effacing the original graph.

Pursuing this illustrative example further, the links displayed in window 40 are effective for retrieving, from the data base embodied in storage device 15, the actual requests issued by a visitor during a visit. Each element of the tabulation displayed in window 40 is an HTML link that directs the browser window 30 to the indicated page.

In our current implementation, the statistical displays are written in Java, and communicate with the other browser windows through JavaScript 1.2 protocols. In addition to separate displays (in, e.g., windows 30, 35, and 40, as shown in the figure), the data browser can directly impose statistical information onto, e.g., window 30 in the visible form of overlays 42, as noted above.

One exemplary use of these overlays is to provide an indication of the respective popularities of selected links followed by visitors requesting page 30. For example, links may be labeled, in an overlay, by respective images each of whose sizes represents the relative popularity of the corresponding link. One image readily sized in that manner is a simple bullseye.

By way of another example, the population requesting a given link may be analyzed into classes, such as "customers" and "competitors" of a corporate content provider. A graphical image such as a bar chart, indicating the relative distribution of requests among these various classes is readily superimposed on the relevant link by means of an overlay.

In yet another example, an overlay contains symbols that designate respective links as principally "content-providing" or principally "aiding navigation." In yet another example, an overlay provides a miniature, pop-up view of the Web page corresponding to a given link.

In our current implementation, JavaScript 1.2 layers and coordinate information contained in JavaScript 1.2 link objects are used to position the overlays 42.

Thus, the use of overlays 42 and windows 30, 35, and 40 as described above enables the user to acquire information about visitors in a natural manner, and to directly visualize the usage data in their proper context, namely, the actual Web pages of Web site 25.

It should be noted in this regard that JavaScript 1.2 layers and HTML frames have the feature that information from different servers can be displayed on the same page. In order to do so, what is needed is simply to provide each relevant URL to the browser through an SRC tag. Thus, as those skilled in the art will appreciate, the display of Web pages simultaneously with statistical information about their patterns of usage as described here is readily implementable using commercially available software.

A significant advantage of our invention is that information about visitors can be readily obtained for every page of Web site 25. This is in contrast to those approaches of the prior art that compile information only about the most popular pages (and typically ignore smaller components such as sub-pages). In particular, this limited type of reporting may be disadvantageous for large corporate sites that attract many thousands, and even millions, of visitors each week. Despite such large traffic, sub-sites corresponding to separate organizations within the company might only entertain a few hundred visitors per week. Under a conventional, limited reporting approach, such sites would typically be forced to go without usage information, or to use specialized reporting software that would have to be regenerated each time the Web site was altered.

2. Preprocessing

With further reference to FIG. 1, a preprocessing stage 85 is advantageously applied for compiling, from raw logfiles obtained from storage device 90, the file resident on storage device 15 that is needed for the on-line browsing of usage statistics.

In the figure, arrow 95 indicates the operation of handing raw data from device 90 to preprocessor 85, and arrow 100 indicates the operation of handing processed records to device 15. Operations 95 and 100 are advantageously performed periodically. A typical repetition frequency for these operations is once per day. However, such a frequency is not essential to the invention, and in fact the system designer has broad discretion in determining this frequency. In fact, processing and updating of statistics files can even be done on a continuous basis.

In an illustrative implementation, the preprocessing is carried out in the following four stages:

(1) filtering and cleaning of the log data;
(2) defining visits;
(3) building the shadow directory database; and
(4) hierarchical accounting of visit information.

Each of these stages will now be briefly described.

2.1. Filtering. As mentioned above, every hit is typically logged by the Web server. However, it is often advantageous to retain only selected lines of the log for further processing. (In particular, this reduces the volume of data that is subsequently manipulated and stored, and thus improves economy and speed.) Such selection can be carried out on any of the fields in the log. As is well known to those skilled in the art, such selection is readily specified in a configuration file. It is not critical where this filtering is carried out. In our current implementation, by way of example, the filtering is carried out by the UWU server.

By way of example, some or all of the following fields may be of interest for treatment in the preprocessing stage:

hostname: The user who is accessing usage data may wish to filter out his own accesses to the Web site, because they might otherwise skew the statistics. Moreover, filtering on this field may be desirable in order to focus specifically on internal or on external visitors.

request method: Ordinary Web browsers typically use the GET request method for downloading Web pages, whereas automated programs such as Web robots (or Web spiders), that download pages for subsequent indexing, often use the HEAD request instead. To exclude accesses by such programs, the user may filter out HEAD requests.

return code: This field can be used, e.g., to retain only those downloads that were successful (as indicated, typically, by a return code of 200).

file type: A typical Web page consists of an HTML document combined with other Web components such as images or sound. If only pageviews are of interest, this field can be used to filter out hits to image and sound files (which are generally identifiable through their file extension, such as ".gif" for images).

2.2. Identifying visits. Several mechanisms can be used for grouping hits into visits. One possibility is to use so-called "cookies". When a visitor first comes to a Web site, the Web server will hand a unique "cookie" to the browser. During subsequent hits the browser hands this cookie back to the Web server. Thus, hits originated from a fixed visitor can be grouped by cookie. This mechanism leads to a reliable method for defining visits. However, Web users are becoming increasingly concerned about the use and misuse of cookies, and current browsers allow the user to disable the cookie mechanism. Therefore, this mechanism is of only limited use for the present purpose.

A method for tracking visitors to a Web site without using cookies, involves serving each Web component through the so-called cgi (Common Gateway Interface) mechanism. That is, the first time a visitor comes through the site, a unique number is assigned to that user. (This first time can be identified by the fact that the request does not include a visitor number mechanism, while all subsequent requests will). The requested page is now served through the cgi mechanism, which changes all the internal links on that page to the appropriate cgi links including the unique visitor number. Consequently, all subsequent requests will go through the cgi mechanism, and all the pages served will have their links correspondingly altered. The visitor number now allows robust tracking of visitors.

Another mechanism which we use in our current implementation, infers visit sequences from only the information in the log file. Hits are combined into a particular visit sequence if they are separated by less than a selectable time interval T (typically, ten minutes, although there is wide latitude for setting this interval) and they originate from the same host into a visit.

We have found that this scheme often works well. However, it can produce an erroneous result if two or more users, acting through the same host, request pages from the same Web site at the same time. This typically happens when user requests are grouped by a so-called "proxy" machine. The individual users request pages only from the proxy, while the proxy caches pages and requests new ones from the actual Web server. Because the Web server sees requests only from the proxy, this method may be unable to distinguish different visitors using the same proxy. We have found, however, that this situation tends to occur infrequently.

More advanced methods for grouping hits into visits can also be used. For example, if a hit has a referral field from a Web page of a different Web site, this can be taken as an indication that a new visit has started. Also, if two visitors using the same proxy visit the same Web site at the same time, they may still be viewing different parts of the Web site, and thus they can be distinguished by the actual web components they download.

Further methods can take advantage of additional information that the browser communicates to the server. For example, the HTTP protocol allows for browsers to provide, among other kinds of information:
(1) the type of browser used, which version, and what kind of platform;
(2) the screen resolution; and
(3) which types of web component the browser is able to display.

Thus, users who differ in any of these fields can be distinguished.

Figure 2:
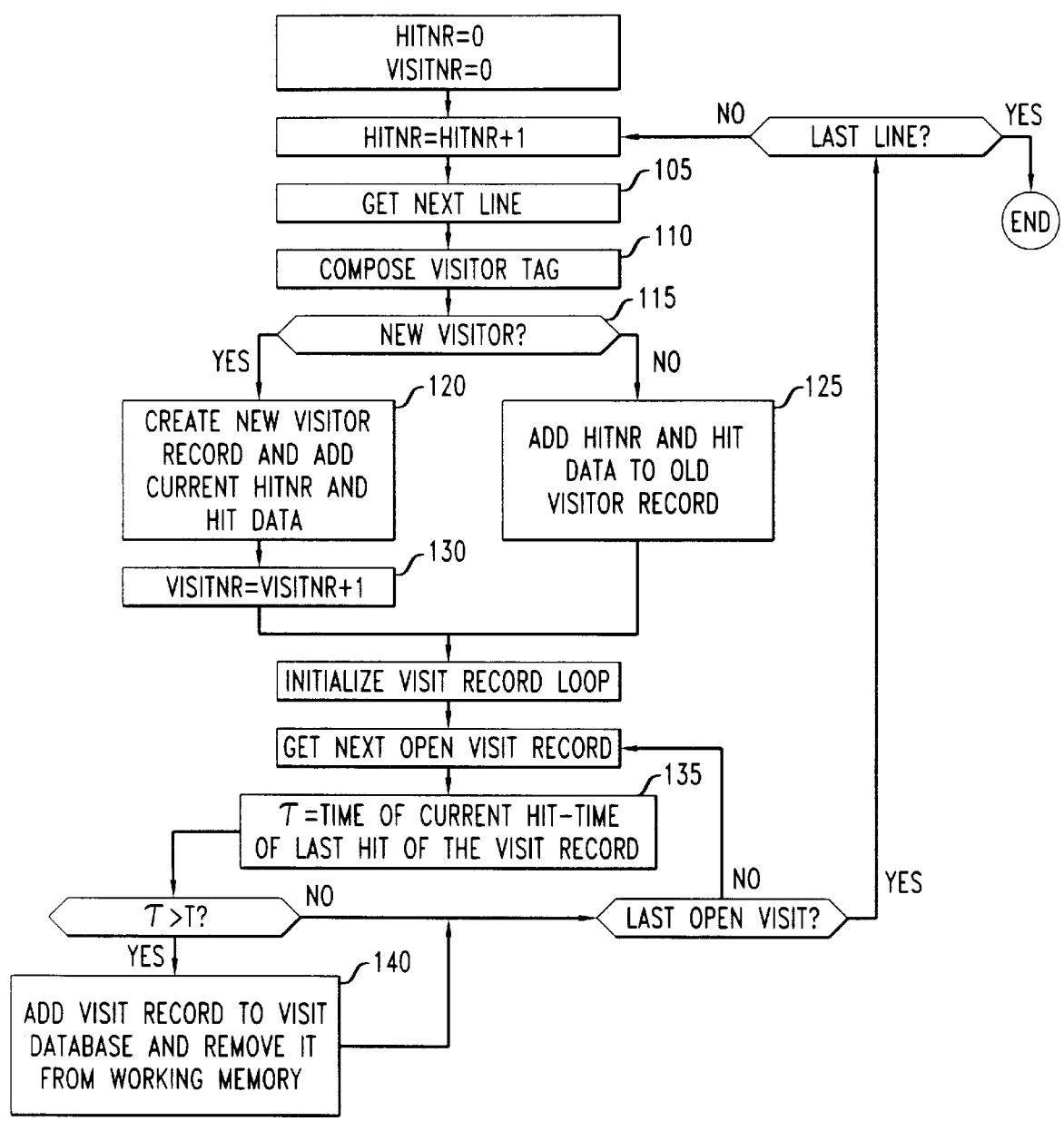
FIG. 2 is a flowchart of an exemplary procedure for assembling hit information into visit records, in accordance with the invention.

In the following discussion, it is assumed that the information to be used for distinguishing users is combined in a user tag. With reference to FIG. 2, we now describe an exemplary procedure for assembling hits (indexed by the variable "hitnr") into respective visits (indexed by the variable "visitnr").

Lines are retrieved sequentially from the log (box 105). The new line so retrieved is the current hit. For each new hit, a visitor tag is composed (box 110). A determination is then made, whether this visitor tag belongs to a new visit (box 115). That is, all of the currently open visits are recorded in working memory. The visit is new if the visitor tag does not belong to any of the currently open visits.

If it is determined that the visit is new, a new visitor-record data structure is created in working memory, and the current hit and hitnr are added to the data structure (box 120). If it is determined that the visit is not new, the hit and hitnr are added to the currently open visitor record identified by the visitor tag (box 125). (It should be noted in this regard that a former visitor who initiates a new visit is treated as a new visitor.) When each new visitor-record data structure is created, a sequential index number (visitnr) is assigned to the corresponding visit (box 130).

Next, a determination is made whether any of the currently open visits have expired. For each of the currently open visit records, the time of the last hit in that record is subtracted from the time of the current hit (box 135). The visit is deemed to have expired if the difference is greater than the threshold T. If the visit has expired, the record of that visit is added to the visit database on disk, and removed from working memory (box 140). The visitnr is included with the data that are sent to disk storage.

Then, the next hit is retrieved, and the process is repeated. Hits with the same visit tag are added in chronological order so long as they are separated by less than the time interval T.

2.3. Building the shadow directory. The visit database is next processed into a new database resident on storage device 15, which we refer to as the shadow-directory database.

It is a general characteristic of files containing Web components that they are organized in a hierarchical file structure. A correspondence to this hierarchical file structure is built into the shadow-directory database, such that its records are retrievable by the names of the corresponding files on the Web server.

By way of example, this correspondence can be achieved by using the same filenames, in the shadow-directory database, as the corresponding Web-page files. Alternatively, as will be appreciated by those skilled in the art, such a correspondence is readily achieved using well-known database technologies to relate files of the shadow-directory database to corresponding Web-page files.

As a consequence, each file in the Web-site directory will have a unique counterpart in the shadow-directory database. The correspondence described above is useful for facilitating on-line retrieval of information from the shadow-directory database by operating it as a parallel Web site.

Figure 3:
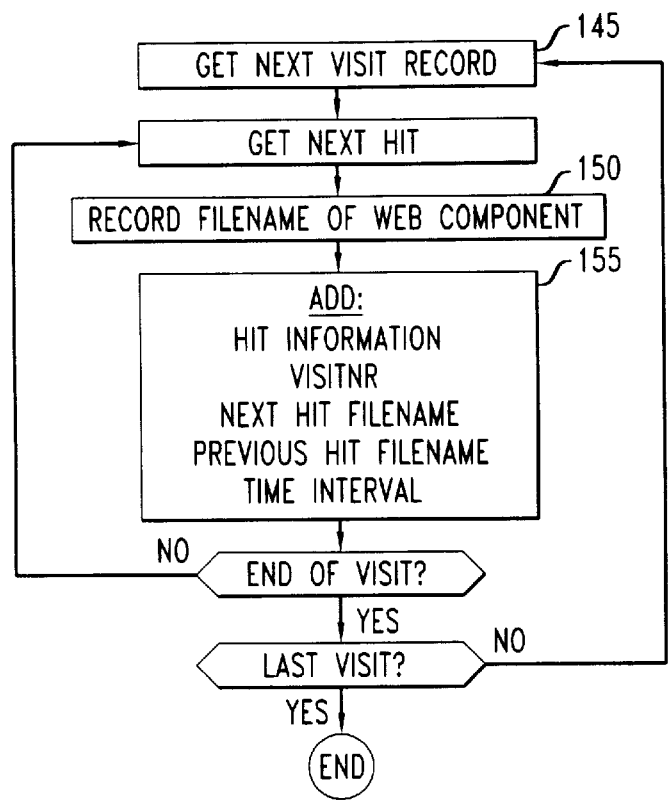
FIG. 3 is a flowchart of an exemplary procedure for building a shadow-directory database in accordance with the invention.

Each file in the shadow-directory database contains the compiled information pertaining to the hits made to the corresponding web component. With reference to FIG. 3, we next describe how this information is compiled.

Each visit record is retrieved, in turn (box 145). For each of these visit records, we record information for each of the hits that it contains. Specifically, we record the filename of the downloaded Web component (box 150) and other information concerning the hit, together with the hitnr index, the visitnr index, the filenames of the next and previous hits, and the time interval between the current hit and the next hit (box 155).

Once built, the shadow-directory database affords immediate access to all the hits to a particular Web component, by simply accessing the corresponding file.

The process described above for building the shadow directory may in some cases be undesirably slow because it calls for shadow-directory files to be opened and closed many times. For this reason, it will in at least some cases be advantageous to first annotate the hits with hitnr, visitnr, and "previous" and "next" fields, and then sort the hits per filename (i.e., according to the name of the requested Web file). This way each file of the shadow directory only needs to be opened and closed once. Then, all of the records associated with each given Web file can be loaded, en masse, into the corresponding shadow-directory file.

Figure 4:
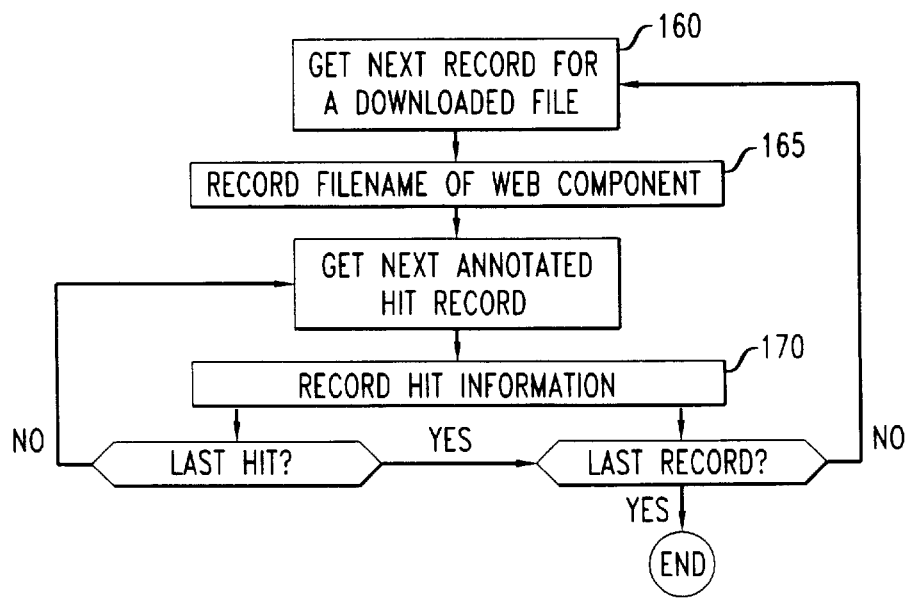
FIG. 4 is a flowchart of an alternative procedure for building a shadow-directory database.

Thus, as shown, e.g., in FIG. 4, the shadow-directory data base is advantageously built by retrieving, in turn, each of these collections of sorted records (box 160). The filename of the respective Web component is recorded (box 165). The hit information is then recorded (box 170) for each of the annotated hit records in the collection.

Below is one illustrative line, with explanatory annotations, in the hypothetical shadow-directory file named "shadow/card.html":

| | |
|---|---|
| pool044-max1.sc-ca-us.dialup.earthlink.net | hostname |
| - | userid [not shown here] |
| 1/05/1998 23:43:09 | date and time |
| /card.html | file accessed |
| 200 | return code |
| 14176 | bytes transferred |
| /work.html | previous file |
| /contact/contact.html | next file |
| 78 | time interval in seconds |

It should be noted that it is sufficient, e.g. for alternate embodiments of the invention, for the shadow directory data base simply to store visitnr indices, rather than to store complete visitor records. The complete records are instead readily retrievable, by visitnr, from the visit data base resident on the UWU server. This scheme avoids duplication, and thus helps to conserve disk space.

Figure 5:
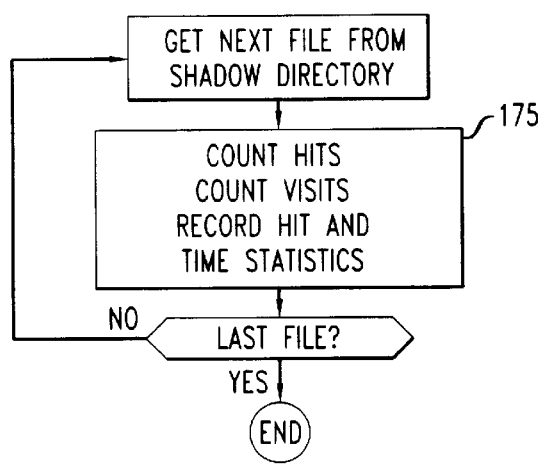
FIG. 5 is a flowchart of an exemplary procedure for further processing of the shadow-directory database in accordance with the invention in certain embodiments.

2.4. Hierarchical Accounting. Further preprocessing is advantageously performed after the shadow directory has been built. In a first stage, as illustrated in FIG. 5, each shadow-directory file is processed in turn. For each of these files, the number of hits over time, the distribution of "previous" and "next" hits, and the distribution of time spent are computed and stored (box 175). It is also advantageous to store the index visitnr for each visit that contains a hit to the corresponding Web file. It should be noted in this regard that the visits to a file are typically fewer than the hits to a file, because a visitor may download a web component multiple times within a single visit.

Figure 6:
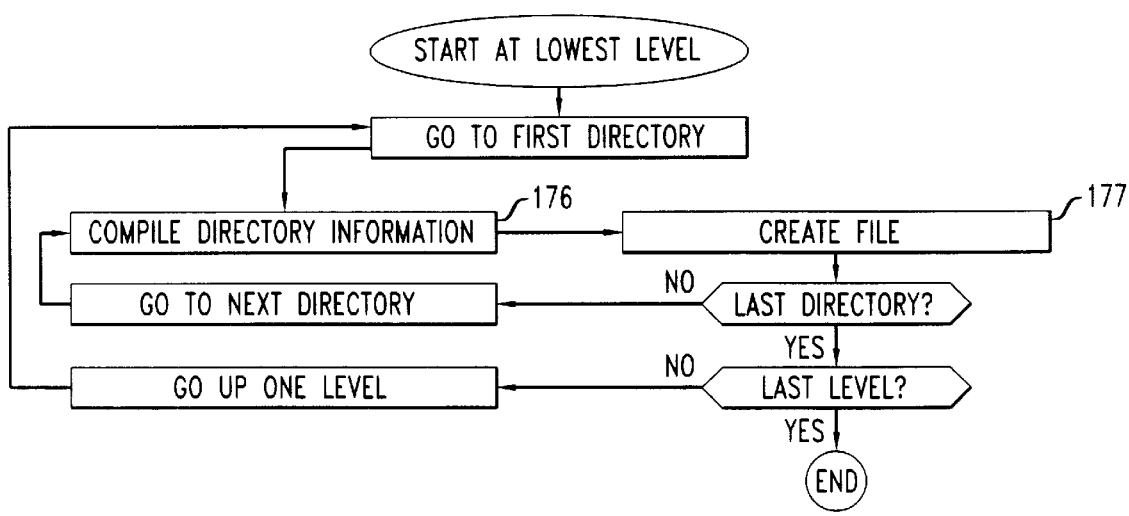
FIG. 6 is a flowchart of an exemplary procedure for compiling directory-level usage information, in accordance with the invention in certain embodiments.

In a second stage, with reference to FIG. 6, directory-level information is computed (step 176) for each directory in the file tree. This is done hierarchically, beginning with the sub-directories at the lowest levels of the tree. For each directory, there is recorded the total number of hits over time to all the files in the directory or any of its subdirectories. It is also advantageous to count the number of distinct visitors to the files in each directory by merging the visitnr indices of the visits to the files in the directory.

Since no such directory-level record specifically relates to any one file, an extra file is created (step 177) in each pertinent directory to contain this information. (In our current implementation, we have found it convenient to designate each of these files by the name "UWU.info".) Thus, each UWU.info file contains, in particular, hit counts and visit counts accumulated over a period of time.

Figure 7:
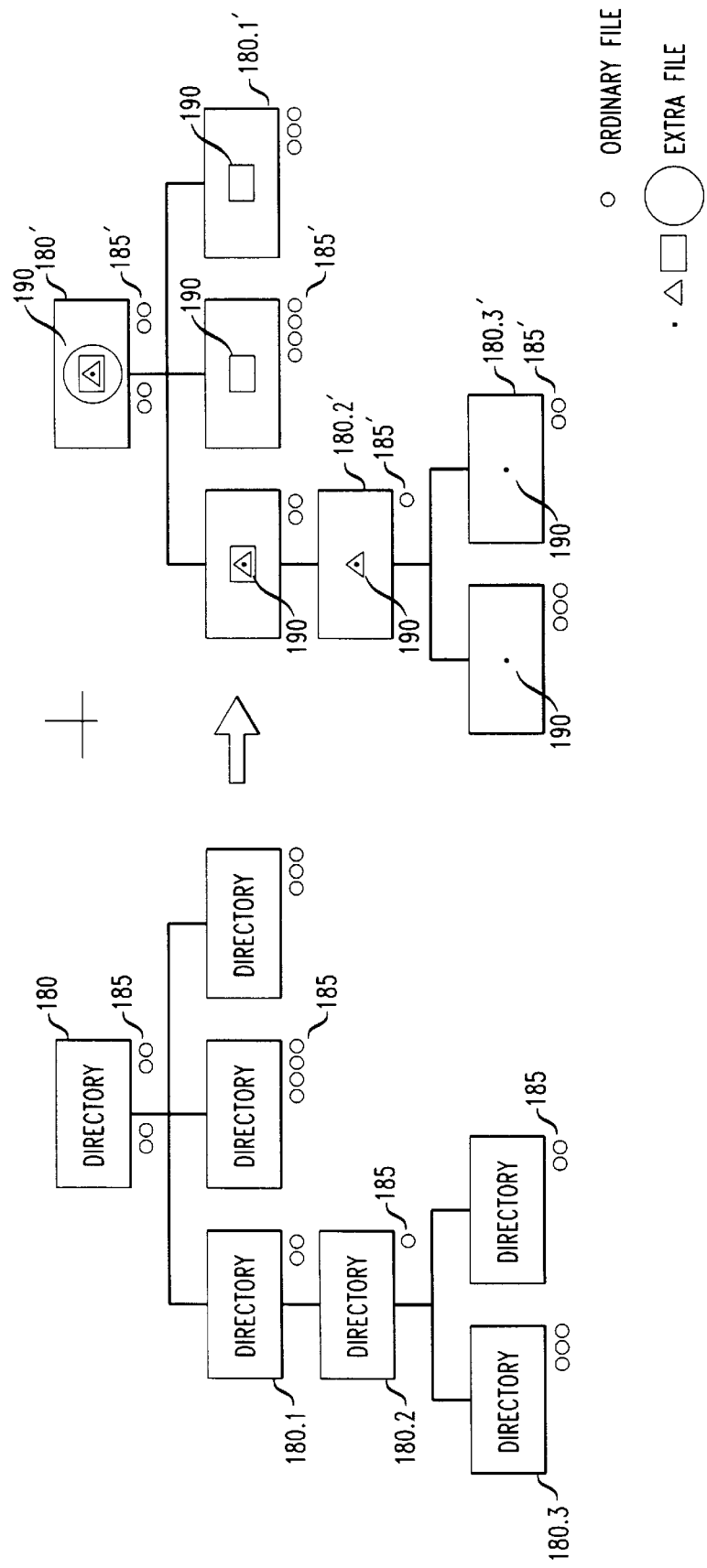
FIG. 7 is a tree diagram of an illustrative Web site and its corresponding shadow-directory database. Included in the shadow-directory tree structure are extra files that contain directory-level usage information.

Thus, with reference to FIG. 7, directory-level information is provided in a file 190 for each directory (180, 180.1–180.3) in the Web file tree. In the figure, the corresponding directories of the shadow-directory database are numbered 180', 180.1'–180.3', respectively. The sub-directories at the lowest levels of the tree shown are numbered 180.3, 180.3'. To each Web file 185, there corresponds a file 185' in the shadow-directory database.

As a conceptual aide in the figure, the symbol that represents each file 190 is drawn as containing the symbols of any lower-level files 190 whose information it (wholly or partly) includes as a component element.

The invention claimed is:

1. A method for building a database of information about visits to a Web site, the Web site comprising Web components organized in a file directory structure having directories and sub-directories, the method comprising:

a) retrieving raw hit records, each raw hit record pertaining to a particular Web component of the Web site;

b) extracting selected information from said raw hit records, thereby to create, from each raw hit record, a filtered hit record, the selected information including information identifying the Web component to which the respective hit record pertains;

c) distinguishing respective filtered hit records according to the visit to which each of them belongs, and associating a particular visit index with each filtered hit record;

d) storing the filtered hit records in a data storage device, said storing step comprising the further step of indexing said records such that each record is retrievable by reference to the filename of the corresponding Web component;

e) proceeding hierarchically from lowest sub-directories to highest directories, compiling for each sub-directory and directory a respective record of collective usage information pertaining to all Web components associated with such sub-directory or directory;

f) storing said collective-hit-information records in the filtered-hit-record data storage device, said storing step comprising the further step of indexing each said record such that it is retrievable by reference to the name of the corresponding sub-directory or directory; and h) organizing said filtered-hit records and said collective-hit records as a further Web site.

\* \* \* \* \*